United States Patent [19]

Kissel

[11] 3,995,482

[45] Dec. 7, 1976

[54] VORTEX SWIRL FLOWMETER SENSOR CIRCUIT

[75] Inventor: William R. Kissel, Taylor, Mich.

[73] Assignee: Chrysler Corporation, Highland Park, Mich.

[22] Filed: May 14, 1974

[21] Appl. No.: 469,933

Related U.S. Application Data

[63] Continuation of Ser. No. 346,513, March 30, 1973, abandoned.

[52] U.S. Cl. .............................................. 73/194 B
[51] Int. Cl.² ........................................ G01F 1/32
[58] Field of Search ............. 73/194 B, 194 C, 204

[56] References Cited

UNITED STATES PATENTS

| | | | |
|---|---|---|---|
| 2,726,546 | 12/1955 | King | 73/204 |
| 3,370,463 | 2/1968 | Chanaud | 73/194 B |
| 3,429,178 | 2/1969 | Durbin | 73/204 X |
| 3,438,253 | 4/1969 | Kuether et al. | 73/204 |
| 3,564,915 | 2/1971 | Tomota et al. | 73/194 B |

OTHER PUBLICATIONS

"Journal of Society of Instrument Control Engineering," (Japan) vol. 10, No. 3, March 1971 pp. 173–188, by Yamasaki et al.
A Book, "Instrument Technology" by Jones, Butterworth & Co. Publishers, pp. 162, 163 copyrighted 1974.

*Primary Examiner*—James J. Gill
*Attorney, Agent, or Firm*—Talburtt & Baldwin

[57] ABSTRACT

A vortex swirl flowmeter sensor circuit electrically connected to an electro-thermal sensor generates a voltage signal output from a flowmeter probe with the signal having a large signal to noise ratio. The sensor is electrically connected in a bridge network in the input to an operational amplifier. The output of the amplifier is fed back through a signal enhancement circuit for maintaining the instantaneous temperature of the sensor, and therefore its resistance constant.

9 Claims, 5 Drawing Figures

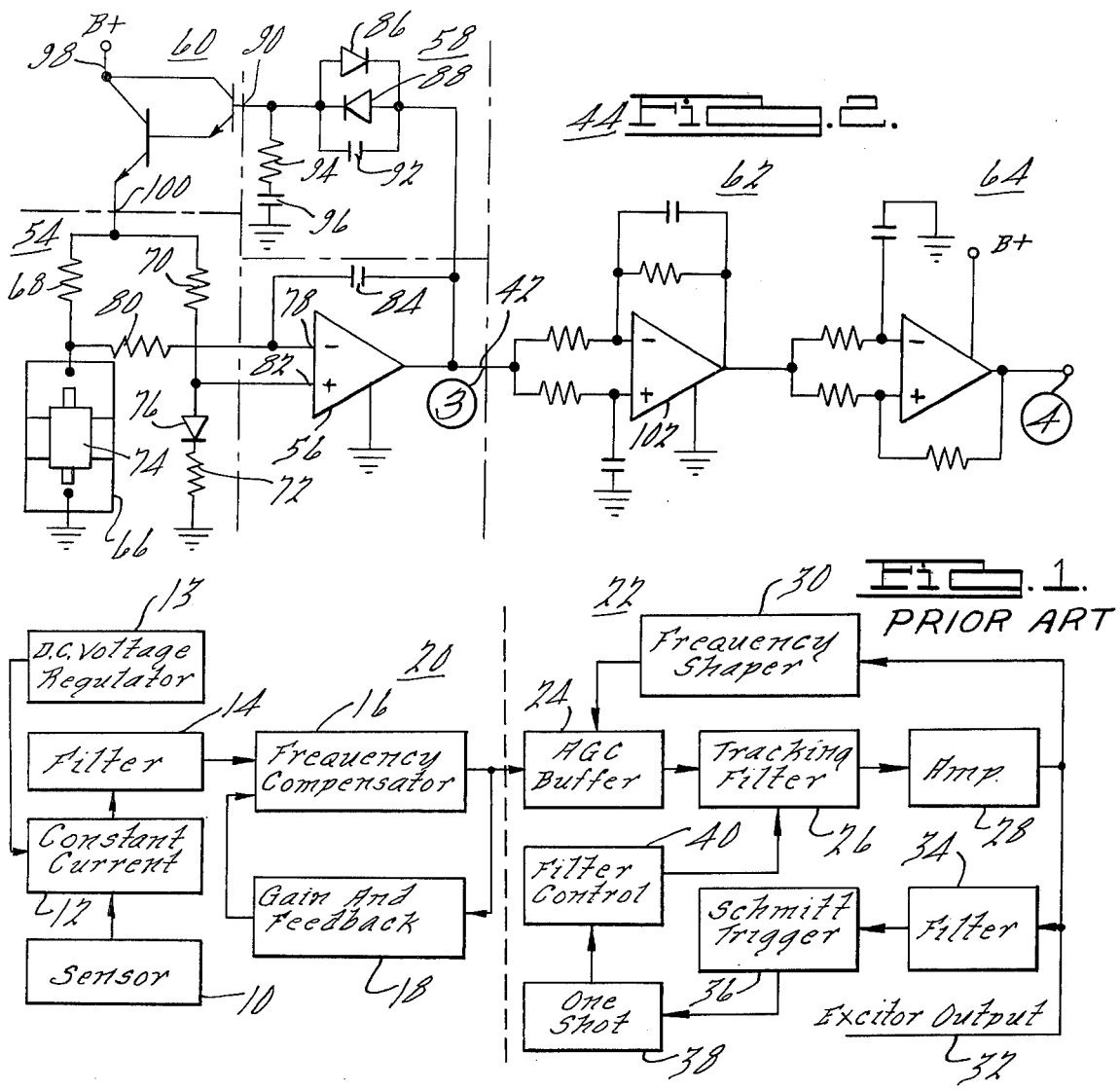
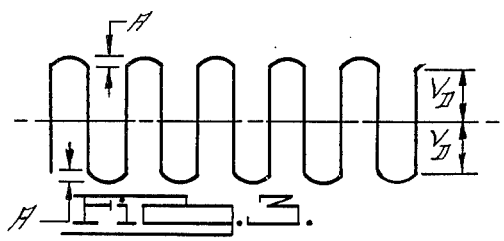
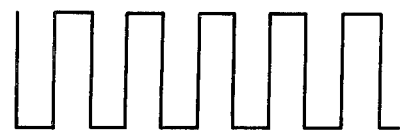
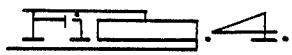
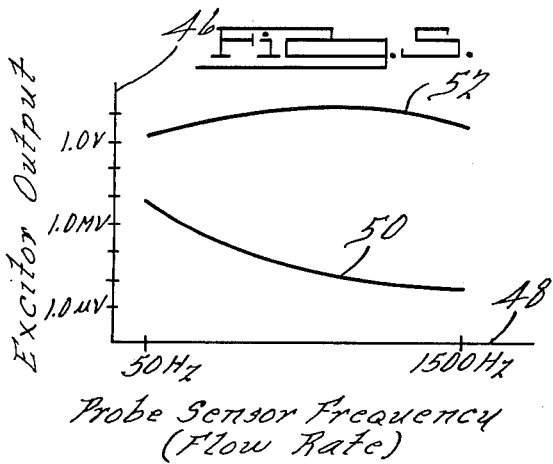

VORTEX SWIRL FLOWMETER SENSOR CIRCUIT

This is a continuation of application Ser. No. 346,513, filed Mar. 30, 1973, now abandoned.

BACKGROUND OF INVENTION

1. Field of Invention

This invention relates to measuring and testing circuits in general and in particular to a circuit responsive to an electrothermal sensor for measuring the rate of flow of a fluid through a swirl flowmeter.

2. Prior Art

Prior art swirl flowmeter circuitry is responsive to a thermistor that is self-heated by an electric current. The source of the electric current is usually from a constant current source. As the precessing low pressure vortex, created by swirl means within the swirl meter and upstream from the probe, passes a probe port, a pneumatic blast impinges on the thermistor. This blast or puff of fluid cools the thermistor for a relatively short period of time. After the vortex passes the probe port, the thermistor temperature rises until the next vortex passes the probe port. This periodic cooling causes a cyclic variation in the temperature of the thermistor and is reflected in a periodic change in the thermistor resistance. As the resistance changes, the voltage drop across the thermistor changes and it is this resulting signal by which the precession frequency of vortex is determined. It is known that there is a well-defined relationship between the precession frequency of the vortex and the rate of flow of the fluid.

The output voltage from the thermistor is optimized by decreasing the size of the thermistor to maximize the surface to heat capacity ratio; by choosing a thermistor material having a high temperature coefficient of resistance; and by operating the thermistor at as high a current as possible within its thermal limitations. In prior art measuring systems, this results in an output voltage which is on the order of millivolts at the low end of fluid flow range of the meter and on the order of microvolts at the high end of the fluid flow range. Even though the amplitude of the pneumatic blast increases with the rate of flow, its duration decreases and for a given thermistor the temperature change which can be produced by such a short duration cooling blast is necessarily small.

This small temperture change of a given thermistor requires complex circuitry to generate a useful voltage signal. In applications such as used in a motor vehicle, shielding and power supply filtering are particularly difficult and the extraction of signal information from thermal noise involves bandpass filters, tracking filters, amplifiers, shaping circuits, automatic gain control and other complex circuit units.

SUMMARY OF INVENTION

It is, therefore, a principal object of this invention to provide a simple electrical circuit responsive to an electrothermal sensor.

It is another object of this invention to provide a circuit that is adaptable to either negative or positive temperature coefficient sensors.

It is yet another object of this invention to provide a circuit that is adaptable to many different sensors and will generate a voltage output signal that is on the order of volts and not microvolts.

These and other objects will become apparent from the following drawings, detailed description and claims of a vortex swirl flowmeter sensor circuit incorporating a bridge circuit, with the electrothermal sensor in one leg, electrically connected to a source of power controlled by a Darlington amplifier. The junction points between each of the elements in the legs of the bridge are electrically connected to the inverting and non-inverting inputs of an operational amplifier. In particular, if the sensor has a positive temperature coefficient characteristic, the junction between it and the adjacent resistor is electrically connected to the inverting input and the other end of the sensor is grounded.

The output of the operational amplifier is electrically connected through a signal enhancement means to be control input of the Darlington amplifier. The enhancement means provides a signal frequency attenuation of signals emanating from the operational amplifier. The main elements may be a varistor or a pair of parallelly conected but oppositely poled diodes electrically connected in series between the output of the operational amplifier and the control input to the Darlington amplifier. Therefore, very small bridge variations are observed as at least a one volt signal at the output of the operational amplifier.

Additionally, the enhancement means includes a resistor-capacitor series circuit electrically connected between the control input to the Darlington amplifier and ground to maintain the voltage level on the control input in the absence of a signal from the operational amplifier.

Additionally, a band pass filter and a Schmitt trigger circuit are electrically connected in series to the output of the operational amplifier for shaping the output signal for use by such means as counters or digital control circuits.

DRAWING DESCRIPTION

In the drawings:

FIG. 1 is a block diagram of a prior art sensor circuit;

FIG. 2 is schematic of the sensor circuit of the present invention;

FIG. 3 is a voltage waveform at point 3 of FIG. 2 illustrating the effect of the signal enhancement means;

FIG. 4 is a voltage waveform at point 4 of FIG. 2;

FIG. 5 is a graph comparing the signal output of the excitor circuits of the present invention and the prior art circuit for the same electrothermal sensor probe.

DETAILED DESCRIPTION

Referring to the FIGS. by the characters of reference, there is illustrated in FIG. 1 a block diagram of a prior art vortex swirl flowmeter sensor circuit. In the block diagram, the sensor 10 is electrically connected to a constant current source 12 which is supplied a well regulated voltage from a voltage regulator 13. The output of the sensor and constant current source 10 and 12 is electrically connected through a low frequency roll-off network or filter 14 to a frequency compensated amplifier 16. The output of the amplifier 16 is electrically connected through a feedback and gain adjustment network 18 to the input of the amplifier. This portion of the block diagram may be identified as a detector amplifier 20.

The output from the detector amplifier 20 is electrically connected to a signal conditioner circuit 22 having a buffer amplifier 24 with an automatic gain control section, a tracking high pass filter 26 and a filter amplifier 28 the output of which is electrically connected through a frequency shaping circuit 30 to the automatic gain control section of the input buffer amplifier 24. The output 32 of the filter amplifier 28, for the purposes of this description, is identified as the excitor output and as will be hereinafter shown, is compared with the present circuitry in FIG. 5.

The excitor output 32 is electrically connected through another filter 34 to a Schmitt trigger 36 circuit for generating a square wave signal. Additionally, the square wave output signal from the Schmitt trigger 36 is supplied through a univibrator or one-shot circuit 38 and a filter control network 40 to the tracking filter 26.

FIG. 5 illustrates in graphic form the excitor output 32 of the circuit of FIG. 1 and the excitor output 42 of the circuit 44 of the present invention for the same sensor probe. In FIG. 5, the ordinate axis 46 of the graph is a plot on log scale of the excitor output 32 and 42 in volts ranging from 1 microvolt to 10 volts. The plot on the abscissa 48 is a plot of the sensor frequency for typical flow rates. The lower curve 50 on the graph indicates the excitor output 32 for the probe when connected in a circuit similar to that illustrated in FIG. 1. This output ranges from approximately 10 millivolts at low flow rates to approximately 10 microvolts at the higher flow rates. As will hereinafter be shown, with that same probe electrically connected in the present circuit its output over the same flow range is always greater than one volt as illustrated by the upper curve 52.

The basis of the approach to the present vortex swirl flowmeter circuitry is the realization that, while the temperature change which can be realized during a short cooling blast is small, the rate of heat loss during a short cooling blast can be significantly higher than that during the rest of the cycle. This is particularly so if the heat loss of the sensor to the pneumatic medium is the principal means of cooling. It is necessary that some excitation means be used to maintain the sensor at, or near, a constant resistance, thereby maintaining it at, or near, a constant average temperture. If this is so, then the rate that heat is lost by the sensor to the pneumatic medium will be continuously matched by the rate at which heat is generated in the sensor by the above excitation means. Thus, the large relative changes in the rate of heat loss over the cycle will be reflected in equally large changes in the power supplied. By observing the power supplied to the thermistor required to maintain it at, or near, constant resistance, the vortex precession frequency is determined.

Referring to FIG. 2, there is illustrated in schematic form the vortex swirl flowmeter sensor circuit 44 of the present invention. The circuit 44 is divided into a bridge section 54, an operational amplifier section 56, an enhancement section 58, a control amplifier section 60, a band pass filter 62, and a Schmitt trigger 64.

The bridge section 54 contains a sensor 66 and a balancing resistor 68 in one leg and a pair of fixed reference resistors 70 and 72 in the other leg. This sensor 66 as illustrated in FIG. 2, may be the sensor as disclosed in the copending application to Gau entitled "Vortex Swirl Flowmeter Probe" which is assigned to a common assignee and has now issued as U.S. Pat. No. 3,830,104, its disclosure being incorporated by reference herein. The sensor chip 74 having a positive temperature coefficient characteristic, is positioned in the bridge as illustrated in FIG. 2. The other leg of the bridge comprises a pair of fixed resistors 70 and 72 and a diode 76 all electrically connected in series and the bridge 54 is electrically connected to the output of the control amplifier 60.

The operational amplifier 56 is a high gain differential input amplifier such as the type μA748 of Fairchild Instrument Co., wherein its inverting input 78 is electrically connected through a resistor 80 to the junction of the sensor 66 and balancing resistor 68 in the one leg of the bridge 54. Norton operational differential current input amplifiers in which some of the components of the bridge are contained within the amplifier also could be used. The positive or non-inverting input terminal 82 is electrically connected to the junction between the two fixed resistors 70 and 72 in the other leg of the bridge. A negative feedback capacitor 84 for attenuating the high frequency components of the output signal 42 of the operational amplifier 56 is electrically connected between the inverting input terminal 78 and the positive output terminal thereof. For comparison purposes of the graph of FIG. 5, the excitor output 42 is taken at the output of the operational amplifier 56.

The enhancement circuit 58 comprises a pair of oppositely poled diodes 86 and 88 electrically connected in parallel with each other. In the alternative, a varistor may be used in place of the diodes. This parallel combination is then connected in series between the output of the operational amplifier 56 and the control input 90 to the control amplifier 60. A high frequency bypass capacitor 92 is connected in parallel with the diodes 86 and 88 to shunt the high frequency signal components around the diode combination.

In the preferred embodiment, the control input 90 to the control amplifier 60 is electrically connected through a resistor 94 and capacitor 96 network to ground for the purpose of maintaining input voltage level when the oppositely poled diode is not conducting.

The control amplifier 60 functions to maintain the current supplied to the bridge 54 at a level to maintain the sensor or thermistor 66 at a predetermined resistance value. In the preferred embodiment, a Darlington amplifier is used wherein its control input 90 is electrically connected to the enhancement circuit 58. Its input 98 is electrically connected to a source of potential and its output 100 is electrically connected to both legs of the bridge circuit 54.

The band pass filter 62 utilizes an operational amplifier 102 as an active element thereof and functions to reject all signals outside of the operational frequency range of the sensor 66. The output of the band pass filter 62 is electrically connected to a Schmitt trigger 64 circuit for providing the digital waveshape signals for counting or control circuitry.

FIGS. 3 and 4 illustrate the voltage waveshapes at particular points of the circuit of FIG. 2. As previously mentioned, FIG. 3 is the signal output 42 of the excitor circuit and is particularly the output of the operational amplifier 56 and FIG. 4 is the output of the Schmitt trigger 64.

The bridge circuit 54 shown in FIG. 2 uses the operational amplifier as the excitation means to maintain the instantaneous temperature sensor 66, and therefore its resistance substantially constant. If the sensor has a positive coefficient of resistance and the ratio of sensor resistance to the balancing resistor 68 in one leg is initially less than resistance ratio of the corresponding resistors in the other leg, the operational amplifier 56 output is driven positive. This positive output will effectively supply more current to the sensor 66 causing it to heat more thereby heating and raising its resistance. However, if the ratio in the one leg comprising the sensor 66 becomes more than the ratio in the other leg, comprising the two resistors 70 and 72, the output drive of the operational amplifier 56 is reduced. This reduces the current to the sensor 66 thereby allowing it to cool and reducing its resistance.

Referring to FIG. 2 and using the reference characters, the resistance ratios are as follows:

a) Resistance ratio in the one leg:
$$\frac{\text{Sensor 66}}{\text{Balancing Resistance 68}} = \frac{R1}{R2}$$

b) Resistance ratio in the other leg:
$$\frac{\text{Resistor 72}}{\text{Resistor 70}} = \frac{R3}{R4}$$

If the sensor is positioned other than that illustrated in FIG. 2, the R1, R2, R3, R4 positions remain the same and the sensor assumes the identity of the position. As an example, a positive temperature coefficient sensor may be placed in position R1 or R4 while a negative temperature coefficient sensor may be placed in R2 and R3 positions with R3 being the preferred position. If the sensor is positioned in the R3 position and the resistance ratio in that leg of the bridge is less than the one leg, the current from the control amplifier will increase through the sensor until the ratios are equal.

The diode 76 in the other leg contributes to the stability of the circuit by allowing small changes in the sensor 66 resistance to occur. Without the diode 76, the operational amplifier 56 may tend to overshoot due to shunt capacitance across sensor 66 or the R4 resistance 70, or due to thermal diffusion effects of the sensor 66. A capacitance electrically connected across the balancing resistance 68 or the R3 resistance 72 may also be used to stabilize the circuit by neutralizing the above mentioned shunt capacitance and thermal diffusion effects. The feedback network 84 from the output of the operational amplifier 56 to the inverting input 78 and the series resistor 80 between the junction and the inverting input may be used to prevent ignition interference from disturbing the circuit by attenuating the high frequency components due to ignition disturbance.

The circuit 44 in FIG. 2 additionally contains the enhancement circuit 58. The error signal developed across the bridge 54 during the operation of flowmeter causes the output of the operational amplifier 56 to increase, as the sensor cooling periodically increases, until the additional heating current compensates for the additional cooling. Likewise, the output decreases as the cooling decreases. The capacitor 96 electrically connected between the control input 90 of the Darlington amplifier 60 and the ground tends to keep the input at a constant voltage when no current flows through the parallel diodes 86 and 88. As an example, if the voltage across the bridge 54 varies periodically by an amount "2A" in FIG. 3 in order to maintain a small error signal into the operational amplifier, the amplifier output must vary by an amount $2(A + V_D)$ where $V_D$ is the forward voltage drop of each of the two parallel diodes 86 and 88 which is essentially constant regardless of the amount of current flowing through the diode. One voltage drop is for positive going signals and the other voltage drop for the negative going signals. Therefore, the small bridge voltage variations occurring at extremely low flow rates are observed as a one volt minimum signal. The parallel capacitor 92 in the enhancement circuit 58 minimizes high frequency ringing and interference by bypassing these high frequencies around the diodes 86 and 88. The high frequency signal is much larger than the low, and, therefore, needs no enhancement. In this manner, the parallel capacitor 92 causes the output of the circuit to be nearly constant with flow.

As previously indicated, the parallel diodes 86 and 88 may be replaced by any type of component such as a varistor which exhibits a substantially constant voltage drop under any current condition.

There has thus been described a vortex swirl flowmeter sensor circuit which is responsive to the changes in the instantaneous temperature and resistance of the sensor for developing large voltage amplitude signals across the wide range of fluid flow rates. The sensor resistance is maintained constant in a bridge type network and this aspect is then sensed by the sensor circuit for developing signals of magnitude substantially larger than the prior art with a circuit complexity substantially less.

What is claimed is:

1. In a motor vehicle having a vortex swirl flowmeter utilizing a thermal-electric sensor in the measuring probe for measuring the rate of air flow into the engine system, a sensor circuit for generating an electrical signal in response to the rate of heat loss of the thermal-electric sensor comprising:
   a bridge type circuit having a balancing resistor and the thermal-electric sensor in one leg thereof and a pair of fixed resistors in the other leg, the resistance ratios in said legs being substantially equal at a predetermined temperature.
   an operational amplifier having a first input electrically connected to the junction between the sensor and said balancing resistor, and a second input electrically connected to the junction between said pair of resistors,
   a Darlington amplifier having its input electrically connected to a source of voltage and its output electrically connected to one of the junctions between said two legs of said bridge circuit, the other junction electrically connected to ground, and
   a signal enhancement means having a pair of oppositely poled diodes and a capacitor electrically connected in parallel circuit with each other, said enhancement means electrically connected in series circuit between the output of said operational amplifier and the control input of said Darlington amplifier for increasing the current output of said Darlington amplifier maintaining said resistance ratios in response to the rate of heat loss of the thermal-electric sensor due to the air flow in the engine system.

2. The sensor circuit according to claim 1 further including a band pass filter electrically connected to the output of said operational amplifier and a Schmitt trigger electrically connected to the output of said band pass filter for generating digital electrical signals having a frequency representing the rate of air flow in the engine system.

3. The sensor circuit according to claim 2 wherein said band pass filter is an active filter utilizing an operational amplifier as the active element of said filter.

4. The sensor circuit according to claim 1 wherein said first input of said operational amplifier is the inverting input, said second input is the non-inverting input, said sensor has a positive temperature coefficient and is electrically connected between said inverting input and ground and said operational amplifier generates a voltage signal inversely proportioned to the rate of heat loss of said sensor.

5. A flowmeter sensor circuit comprising:
a source of electrical energy;
a first and second resistor electrically connected in a first series circuit defining a first resistance ratio of second resistor to said first resistor,
a thermal-electric sensor varying its resistance in response to temperature variations,
a balancing resistor electrically connected in a second series circuit with said sensor defining a second resistance ratio of said sensor to said balancing resistor,
said first and second series circuits electrically connected in a parallel circuit and said balancing resistor adaptable for initially equalizing the resistance ratios at a predetermined temperature;
an operational amplifier electrically connected to said source and having at least two inputs and an output wherein said inputs are respectively electrically connected to the junction between said first and second resistors and to the junction between said sensor and said balancing resistor;
a control amplifier having a control input, a power input and an output, said output electrically connected to said one end of said parallel circuit and said power input electrically connected to said source of electrical energy;
a signal enhancement means comprising a pair of oppositely poled diodes electrically connected in parallel to each other and to a high frequency by-pass means and in electrical series circuit between said control input of said control amplifier and the output of said operational amplifier; and
a resistor-capacitor series circuit electrically connected between said control input to said control amplifier and ground.

6. In combination with a vortex precession swirl flowmeter, a sensor circuit comprising:
a first and second resistor electrically connected in a first series circuit defining a first resistance ratio of said second resistor to said first resistor,
a thermal-electric sensor tending to vary its resistance in response to temperature variations.
a balancing resistor electrically connected in a second series circuit with said sensor defining a second resistance ratio of said sensor to said balancing resistor,
said first and second series circuits electrically connected in a parallel circuit with said balancing resistor set for initially equalizing the resistance ratios at a predetermined temperature.
a high gain operational amplifier having a pair of input terminals and output terminals wherein one of said input terminals is electrically connected to the junction between said first and second resistors and the other of said input terminals is electrically connected to the junction between said sensor and said balancing resistor and said output terminals are electrically connected in a feedback circuit to the opposite ends of said parallel circuit for supplying electrical excitation energy thereto in an amount and at a rate to maintain the instantaneous temperature of said sensor substantially constant for maintaining said resistance ratios, and
frequency responsive utilization means coupled to the output terminals of said operational amplifier;
said sensor circuit additionally including a feedback capacitor electrically connected between one of the output terminals of said operational amplifier and the other of said input terminals and a series resistor interposed in the connection between the said other of said input terminals and the junction between said balancing resistor and said sensor for attenuating high frequency signals generated external to the flowmeter sensor circuit.

7. In combination with a vortex precession the fluid swirl flowmeter, a sensor circuit comprising:
a source of electrical energy,
a first and second resistor electrically connected in a first series circuit defining a first resistance ratio of said second resistor to said first resistor,
a thermal-electric sensor tending to vary its resistance in response to temperature variations.
a balancing resistor electrically connected in a second series circuit with said sensor defining a second resistance ratio of said sensor to said balancing resistor,
said first and second series circuits electrically connected in a parallel circuit with said balancing resistor set for initially equalizing the resistance ratios at a predetermined temperature,
a high gain operational amplifier electrically powered from said source and having a pair of input terminals and output terminals wherein one of said input terminals is electrically connected to the junction between said first and second resistors and the other of said input terminals is electrically connected to the junction between said sensor and said balancing resistor and wherein said output terminals are electrically connected in a feedback circuit to the opposite ends of said parallel circuit for supplying electrical excitation energy thereto in an amount and at a rate to maintain the instantaneous temperature of said sensor substantially constant for maintaining said resistance ratios, and
frequency responsive utilization means coupled to the output terminals of said operational amplifier;
said sensor circuit additionally including a three-terminal Darlington control amplifier interconnected in said feedback circuit, said Darlington amplifier having a control input terminal electrically connected to one of the output terminals of said operational amplifier, an output terminal electrically connected to one end of said parallel circuit and its other terminal connected to one side of said source of electrical energy, the other side of which source is connected to the other end of said parallel circuit, said Darlington Amplifier responsive to the output signal of said operational amplifier for maintaining said resistance ratios, and
a signal enhancement means comprising a pair of oppositely poled diodes electrically connected in parallel to each other and to a high frequency by-pass means in electrical series circuit between the said control input terminal of said Darlington control amplifier and the said one of the output terminals of said operational amplifier, and a resistor-capacitor series circuit electrically connected between the said control input terminal of said Darlington Control amplifier and the said other side of said source of electrical energy.

8. In combination with a vortex type flowmeter for measuring volumetric flow rate through a conduit having a fluid stream conducted therethrough including means in the path of the stream for imparting to the stream a periodically varying vortex characteristic having a frequency proportional to the volume of fluid flow therethrough and a temperature dependent resistor in the stream path and subjected to said stream vortex characteristic periodically tending to cool and change the resistance of said resistor in accordance with the frequency of said vortex characteristic and, therefore, the volume of fluid flow through said conduit, circuit means for measuring the frequency of said periodically varying vortex stream characteristic including a bridge circuit having a pair of excitation input terminals and a conjugate pair of signal output terminals with said temperature dependent resistor connected in one of the arms of the bridge between one of the said input and one of the said output terminals of the bridge circuit and resistance elements connected in the other arms of the bridge proportioned to balance the bridge for a predetermined operating temperature for the temperature dependent resistor, a high gain differential operational amplifier having a pair of oppositely poled signal input terminals each coupled to a different one of the conjugate output terminals of the bridge circuit and having a pair of oppositely poled output terminals each coupled back to the excitation input terminals of the bridge circuit for supplying excitation power to the bridge circuit in an amount and at a rate to balance the bridge and maintain the instantaneous temperature of said temperature dependent resistor substantially constant as it is subjected to the periodic cooling effect of said periodically varying vortex stream characteristic, and frequency responsive means coupled to the output terminals of the differential amplifier means and in parallel with the input terminals of said bridge circuit to provide a measure of the volumetric rate of fluid flow in terms of the frequency of said vortex stream characteristic, said bridge circuit further including a substantially constant voltage producing source contained in an arm of the bridge connected between an input terminal of the differential amplifier and an oppositely poled output terminal of said amplifier for stabilizing the differential operational amplifier against overshoot.

9. Apparatus in accordance with claim 8 above wherein said constant voltage producing source is a semiconductor diode.

\* \* \* \* \*